UNITED STATES PATENT OFFICE.

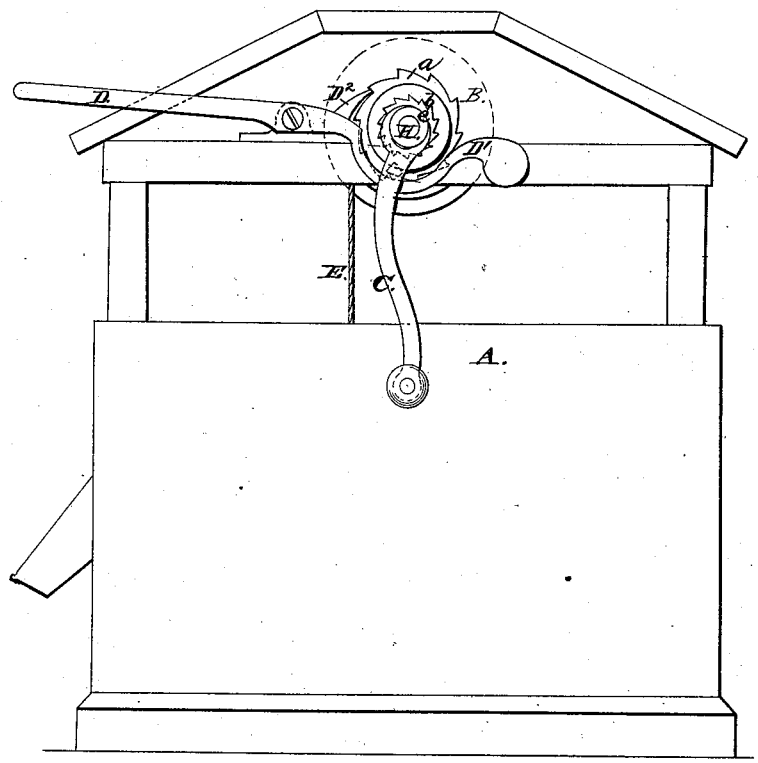
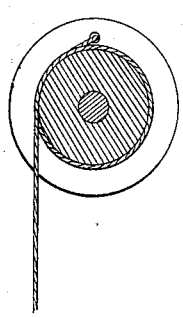
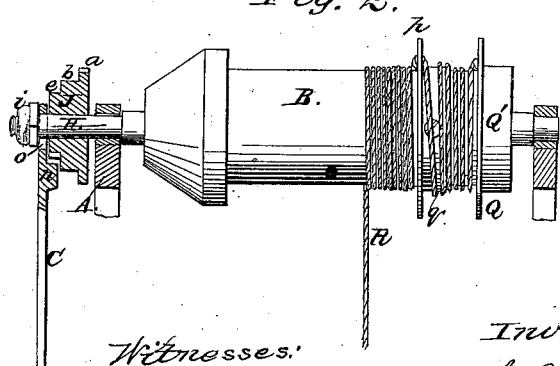

ASAHEL TARBOX, OF WILLIMANTIC, CONNECTICUT.

IMPROVEMENT IN WATER-ELEVATORS.

Specification forming part of Letters Patent No. 46,403, dated February 14, 1865.

*To all whom it may concern:*

Be it known that I, ASAHEL TARBOX, of Willimantic, in the county of Windham and State of Connecticut, have invented a new and useful Improvement in Water-Elevators; and I do hereby declare that the following is a full, clear, and exact description thereof, which will enable those skilled in the art to make and use the same, reference being had to the accompanying drawings, forming part of this specification, in which—

Figure 1 is an elevation of a well-curb with my improvements attached. Fig. 2 is a side view of the windlass, the crank and its appurtenances being shown in section. Fig. 3 is a cross-section of the windlass.

Similar letters of reference indicate corresponding parts.

A represents the frame which supports the windlass, whose shaft H runs thereon in suitable bearings. Upon that end of the windlass which is opposite the crank I fix a head, composed of a ring, D, set vertically around the windlass and secured thereto rigidly by means of its flange Q, which embraces the windlass. To this head I secure the end of the rope R, after having passed it through a hole cut through the ring $p$ of another similar head, whose flange $q$ also embraces the windlass. When the rope R is fastened to the head Q Q' and the head $p\ q$ is left loose on the windlass, if the windlass is turned and the head $p\ q$ is held stationary, the rope R will be wound upon the windlass between the two heads, reeving through the hole in the head $p\ q$ as it is brought up from the well. If the head $p\ q$ is then screwed to the windlass the rope will be locked between the heads, and the length of rope in use will be the portion outside of the head $p\ q$.

J is a circular box or wheel, whose face has three different diameters. It is rigidly secured to the shaft H. It contains or consists of a ratchet-wheel, $a$, a friction-ring, $b$, and a ratchet-wheel, $e$, The ratchet-wheel $a$ is engaged at certain times by a detent, $D^2$, on a lever, D, pivoted to the frame of the well-curb. That end, D', of the lever-wheel which lies beyond its fulcrum and beyond the detent $D^2$ is curved so as to pass beneath the wheel J and directly under its friction-ring $b$. When the lever D is raised up, its detent $D^2$ engages with the ratchet $a$ and stops the rotation of the windlass. When the lever is borne downward, the detent is disengaged, and the brake D' is brought up against the friction-ring $b$, and the windlass is also prevented from being rotated. The crank C is put loosely upon the shaft H outside of the wheel J, and is held thereon by nuts $i$. The eye O of the crank is an elongated slot whose shortest diameter is equal to the diameter of the shaft. A dog, $n$, is formed on the inner face of the crank in such a position that when the crank is in its normal position, as shown in Fig. 2, and hangs upon the shaft, the dog $n$ will be free from the teeth of the ratchet $e$; but when it is pushed upward the dog $n$ engages the ratchet $e$, and if the crank is then turned the shaft H and windlass will be carried around with it.

These devices are so simple and complete in their objects and operation that no further explanation need be given of their construction and mode of being used than that which has been already given above.

I claim as new and desire to secure by Letters Patent—

1. The combination with a rotating shaft of a loose crank, which can be alternately connected with and disconnected from the shaft on which it is hung by means of its enlarged eye and a dog on the side of the crank, substantially as above described.

2. In combination with a crank constructed and operating as above described, the brake-apparatus, consisting of the lever D, its detent $D^2$, its brake D', and the ratchet-wheel $a$ and friction-ring $b$, substantially as above set forth.

ASAHEL TARBOX.

Witnesses:
J. R. ARNOLD,
GEO. C. ELLIOTT.